(12) United States Patent
Argyros et al.

(10) Patent No.: US 10,747,751 B2
(45) Date of Patent: Aug. 18, 2020

(54) MANAGING COMPLIANCE DATA SYSTEMS

(71) Applicant: Promontory Financial Group LLC, Washington, DC (US)

(72) Inventors: Kelly A. Argyros, Fairfax, VA (US); Vinit V. Patankar, Herndon, VA (US); Deepak Unnikrishna Pillai, Sterling, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 354 days.

(21) Appl. No.: 15/843,004

(22) Filed: Dec. 15, 2017

(65) Prior Publication Data

US 2019/0188293 A1 Jun. 20, 2019

(51) Int. Cl.
*G06F 16/23* (2019.01)
*G06F 16/13* (2019.01)
*G06F 16/11* (2019.01)
*G06F 16/25* (2019.01)

(52) U.S. Cl.
CPC ........ *G06F 16/2365* (2019.01); *G06F 16/122* (2019.01); *G06F 16/13* (2019.01); *G06F 16/258* (2019.01)

(58) Field of Classification Search
CPC ...... G06F 16/94; G06F 16/9558; G06F 16/93; G06F 16/80; G06F 16/13; G06F 16/122; G06F 16/235; G06F 16/258

USPC ................................... 707/690, 691
See application file for complete search history.

(56) References Cited

U.S. PATENT DOCUMENTS

| | | | |
|---|---|---|---|
| 9,672,281 B1* | 6/2017 | Kapoor | G06F 16/24 |
| 2007/0061156 A1 | 3/2007 | Fry et al. | |
| 2007/0294248 A1 | 12/2007 | Pearman | |
| 2008/0091677 A1* | 4/2008 | Pedersen | G06F 21/602 |
| 2012/0310700 A1 | 12/2012 | Kurtz et al. | |
| 2013/0144785 A1* | 6/2013 | Karpenko | G06Q 20/409 705/44 |
| 2013/0311224 A1* | 11/2013 | Heroux | G06Q 90/00 705/7.15 |
| 2018/0032855 A1* | 2/2018 | Wang | G06F 16/3329 |
| 2019/0132350 A1* | 5/2019 | Smith | G06F 21/577 |

* cited by examiner

*Primary Examiner* — James Trujillo
*Assistant Examiner* — Fariborz Khoshnoodi
(74) *Attorney, Agent, or Firm* — Cuenot, Forsythe & Kim, LLC

(57) ABSTRACT

A method, computer program product, and computer system for managing compliance data systems. A file is received from a data source. At least one obligation protocol from content of the file is identified. The content file is stored in a first database in response to determining that the at least one obligation protocol is indicative of an optional obligation protocol. A risk assessment score of the entity is generated based on a subset of the optional obligation protocols.

20 Claims, 5 Drawing Sheets

MANAGING COMPLIANCE DATA SYSTEMS

TECHNICAL FIELD

The present invention relates generally to a method, system, and computer program product for managing database and interface systems. More particularly, the present invention relates to a method, system, and computer program product for managing compliance data systems.

BACKGROUND

File systems are used to control how data is stored and retrieved. Without a file system, information placed in a storage medium would be one large body of data with no way to tell where one piece of information stops and the next begins. By separating the data into pieces and giving each piece a name, the information is easily isolated and identified. Further, the categorized files can be searched and retrieved for other computing operations. The advantages of an efficient approach of managing file systems are being accentuated as the amount of data is growing rapidly.

File systems may use a plurality of database systems to ensure similar data is stored in the same memory stack in a consistent manner. Database systems may include a collection of schemas, tables, queries, reports, views, and other elements which database administrators may utilize to design database models based on the system and application needs. Database systems are also used to optimize information retrieval that increases speed and accuracy. The retrieved data may be made available in a form basically the same as it is stored in the database or in a new form obtained by altering or combining existing data from the database.

SUMMARY OF THE INVENTION

The illustrative embodiments provide a method, system, and computer program product. An aspect of the present invention receives a file from a data source, the file comprising compliance data. The aspect of the present invention identifies at least one obligation protocol from content of the file. The aspect of the present invention stores the content file in a first database in response to determining that the at least one obligation protocol is indicative of an optional obligation protocol that can be conducted by an entity but not required. The aspect of the present invention generates a risk assessment score of the entity based on a subset of the optional obligation protocols.

An aspect of the present invention includes a computer program product. The computer program product includes one or more computer-readable storage devices, and program instructions stored on at least one of the one or more storage devices.

An aspect of the present invention includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION OF THE EMBODIMENTS

Figure 1:
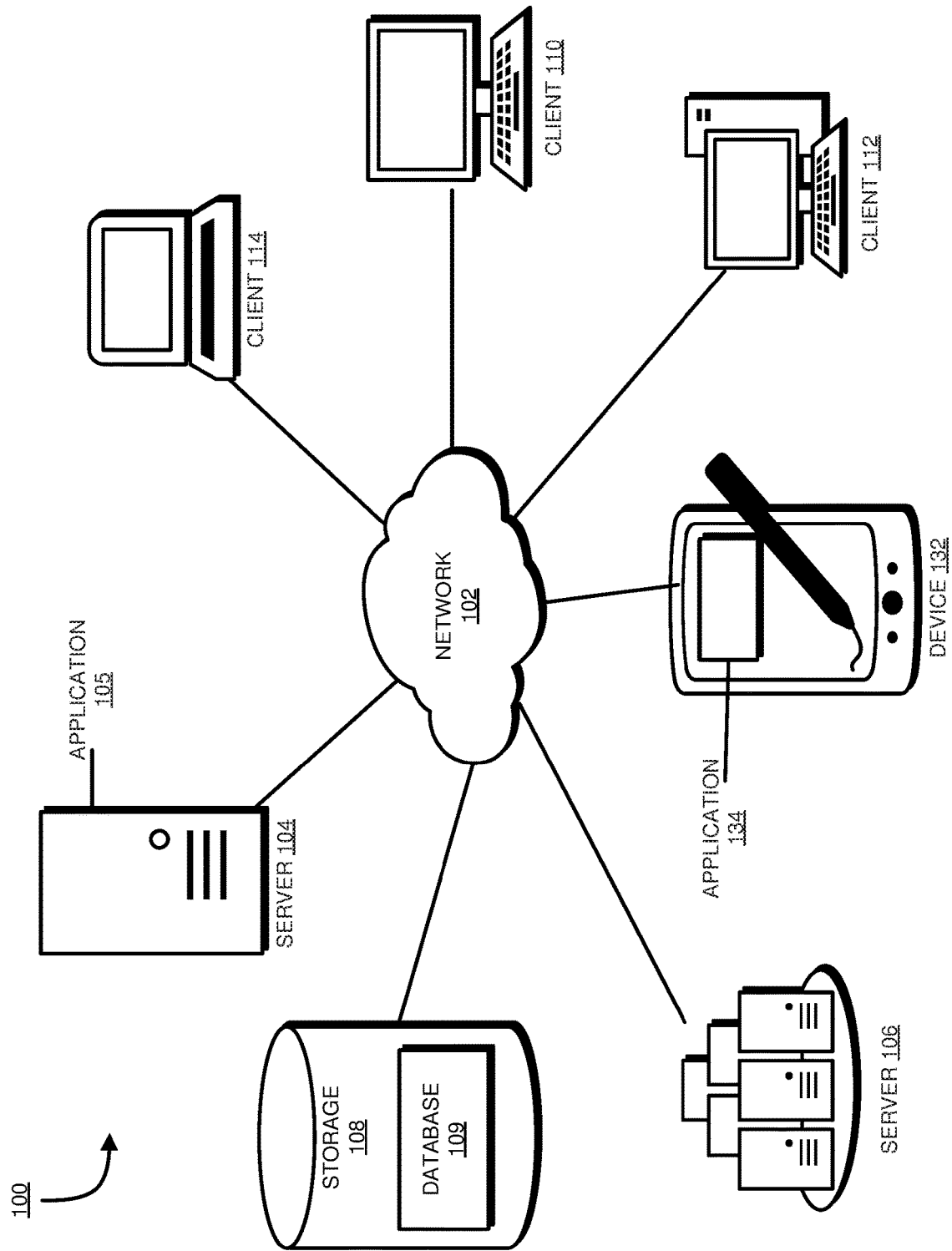
FIG. 1 depicts a block diagram of a network of data processing systems in which illustrative embodiments may be implemented.

Illustrative embodiments recognize that several entities operate in an environment where regulatory activities are prevalent. Regulations issued by different categories of entities such as Consumer Financial Protection Bureau and Office of Foreign Asset Control are increasing exponentially on a daily basis, and most of these rules and regulations by the entities impose compliance obligations on the entities when they conduct their business operations. Illustrative embodiments recognize that entities in some industries face numerous compliance obligations at the entire entity level, whereas other entities need to address compliance obligations only when they conduct a specific subset of their business activities. Illustrative embodiments further recognize that some entities may provide a set of products and services that may be regulated more than the entities' other products and services. Illustrative embodiments recognize that an entity's failure to implement or follow relevant compliance obligations may lead to negative consequences, ranging from sanctions to being barred from operating in a business space altogether.

Illustrative embodiments recognize that the entities have a difficult time keeping up the ever-increasing number of compliance obligations. In addition to newly announced regulations which trigger additional compliance obligations, illustrative embodiments also recognize that existing regulations may be amended by adding or revising certain language, which may likely lead to additional compliance obligations. Illustrative embodiments also recognize that existing regulations may be removed in part or altogether, which may result in certain compliance obligations to be outdated.

With an increasing number of applicable compliance obligations, illustrative embodiments recognize that entities have leveraged software systems to monitor, select, and certify their level of compliance with the obligations. For example, a database can store a compilation of compliance obligations which are assigned to a set of business categories and provide summaries of the obligations along with the regulations to which the obligations relate. Illustrative embodiments recognize that compliance obligation software systems can be incorporated into a risk assessment software to evaluate operational risk exposed to an entity based on the extent of the compliance obligations as well as a set of recommendations it needs to follow in order to reduce such operational risk. Further, illustrative embodiments recognize that these software systems may identify and assign action items to a compliance obligation. For example, Federal Deposit Insurance Corporation (FDIC) provides Dodd-Frank regulations that require a compliance obligation of conducting annual stress tests for financial institutions having assets above a certain value. A compliance obligation software system identifies a set of action items, such as gathering baseline stress test scenarios and reporting to FDIC, and assigns the set of action items to the compliance obligation resulting from the Dodd-Frank regulations. In this manner, an entity may streamline the process of staying current with its compliance obligations and can be confident that it will avoid adverse regulatory ramifications.

Illustrative embodiments recognize that the existing software systems limit the management of compliance obligations to those that are mandatory. However, organizations may desire to leverage another set of compliance obligations that may be purely optional. Reasons may include protection against potential future liability and financial benefits (e.g., tax credits) that may impact the organizations. Indeed, regulations set forth several compliance obligations that may be optional though could be considered as best practices for the industry.

Illustrative embodiments recognize that having the flexibility to determine categories of compliance obligations will benefit the organizations, including avoiding potential liability and leveraging advantages brought by compliance of these obligations. Moreover, illustrative embodiments recognize that a system and an interface capable of determining whether a compliance obligation is optional is desired.

The illustrative embodiments recognize that the presently available tools or solutions do not address the needs or provide adequate solutions for these needs. The illustrative embodiments used to describe the invention generally address and solve the above-described problems and other problems related to database management of obligations data.

An embodiment can be implemented as a software application. The application implementing an embodiment can be configured as a modification of an existing software platform, as a separate application that operates in conjunction with an existing software platform, a standalone application, or some combinations thereof.

In one embodiment of the present invention, the system generates a set of optional compliance obligations and track the compliance status of such obligations. In one embodiment, the system categorizes and store an incoming obligations data to either an obligations inventory database that stores optional obligation data of an organization, or an existing inventory database that includes legally mandated obligations. In this embodiment, the incoming obligations data may be drawn from internal database and/or imported from their third-party databases. In one embodiment, the system allows users to map obligation data to specific areas of the entity's business, including policies and protocols, products, and legal entities.

In one embodiment, the system retrieves data from both optional obligation library database and mandatory obligation library database and provides them to be displayed on a graphical user interface. In one embodiment, the interface allows a user to toggle an obligation data element to indicate or otherwise confirm whether it is designated as legally required or optional and provides tracking functionality for both toggled options. In one embodiment, the system allows certification of each obligation data, optional or mandatory, of an entity.

The illustrative embodiments are described with respect to certain types of obligation data, databases, interfaces, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Content files, operations, protocols, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
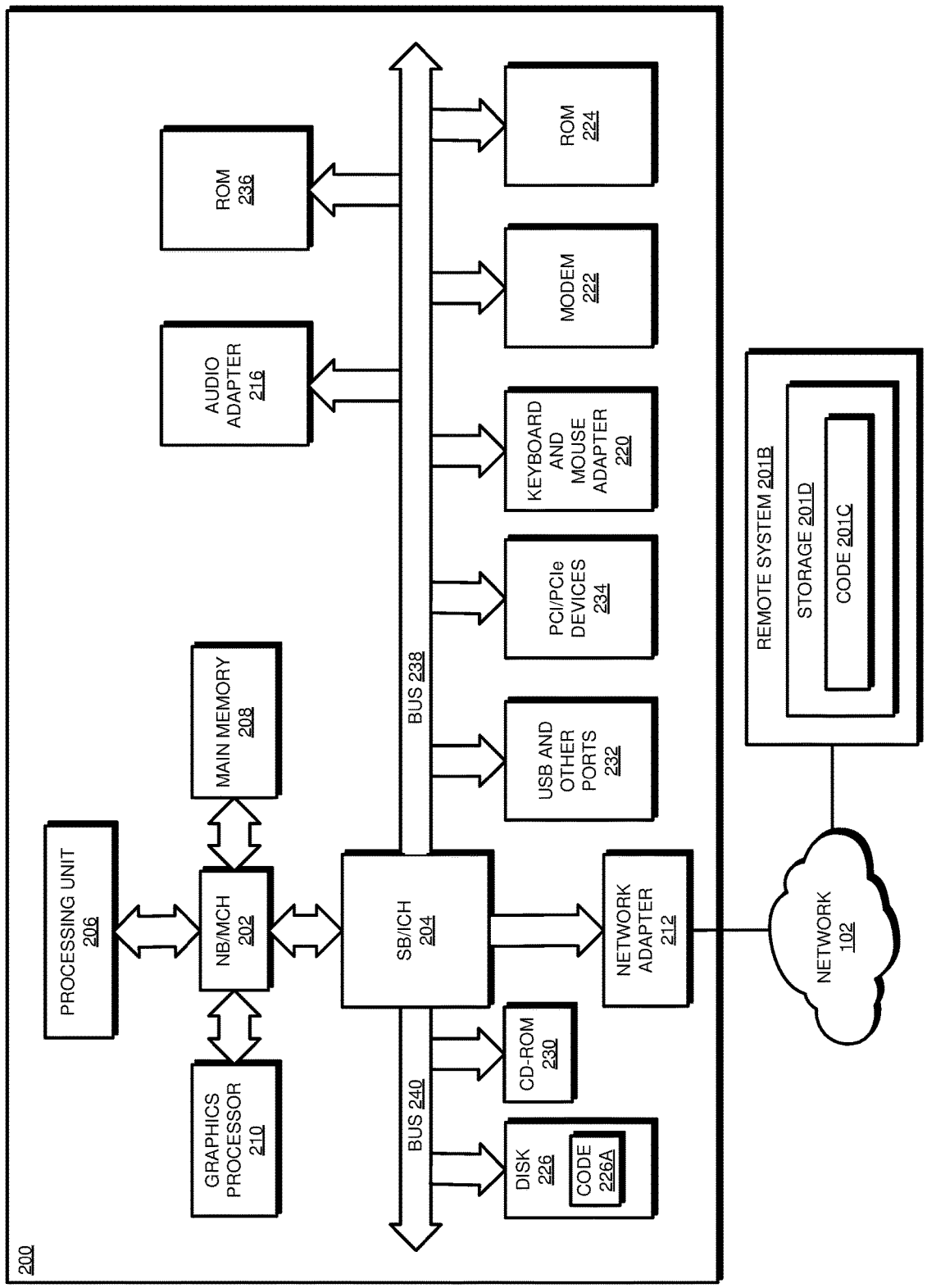
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 alone, application 134 alone, or applications 105 and 134 in combination implement an embodiment described herein. Channel data source 107 provides the past period data of the target channel or other channels in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 and/or application 134 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
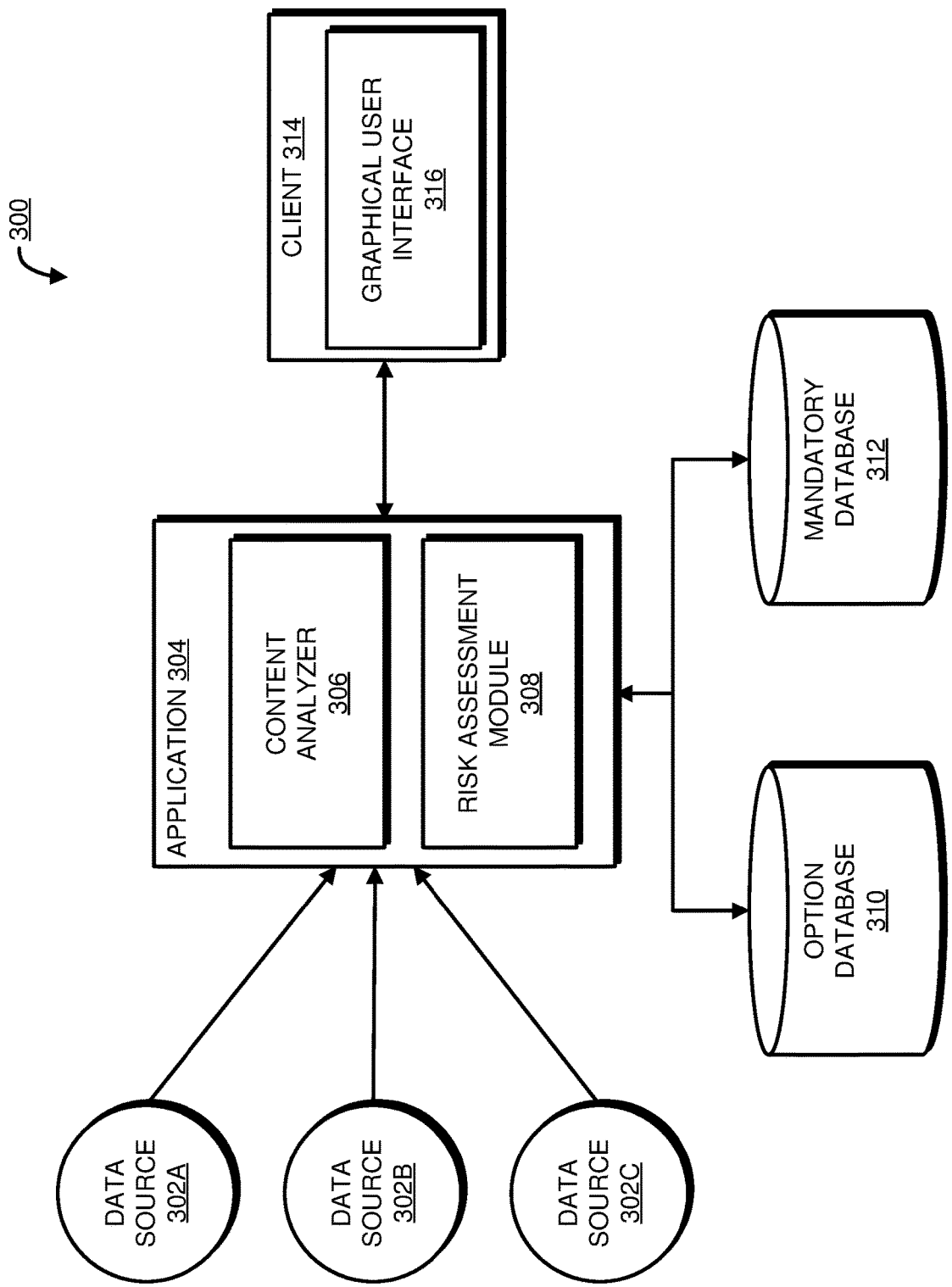
FIG. 3 depicts a block diagram of an example system for managing compliance data systems in accordance with an illustrative embodiment.

With reference to FIG. 3, this figure depicts a block diagram of an example system for managing compliance data systems in accordance with an illustrative embodiment. Application 304 is an example of application 105 in FIG. 1. Client 314 is an example of clients 110, 112, and 114 in FIG. 1.

Data sources 302A, 302B, and 302C may provide at least one content file to application 304. In several embodiments, content file can be any file which includes data that can be analyzed and processed by application 304 and may include compliance obligations document. In one embodiment, data sources 302A, 302B, or 302C may be internal document sources or external document sources from which the content file originated. In some embodiments, application 304 may subscribe to data sources 302A, 302B, or 302C which published content files that are relevant to data stored in option database 310 and/or mandatory database 312. As data sources 302A, 302B, or 302C updates content files, application 304 may retrieve the relevant content files from the data sources through automatically downloading the files. In some embodiments, application 304 may request a separate server (e.g., server 104 and/or 106 in FIG. 1) to retrieve content files from data sources 302A, 302B, or 302C.

Application 304 includes content analyzer 306 and risk assessment module 308. In one embodiment, content analyzer 306 receives at least one content file from data sources 302A, 302B, or 302C and determines whether the content files should be associated with option database 310 or mandatory database 312. In several embodiments, content analyzer 306 parses the data from the content files such as metadata and text written into the files to identify that the content files include content that an entity is required to implement or enforce. In some embodiments, content analyzer 306 may calculate a confidence score for each content file based on the parsed information, and if the confidence score exceeds a threshold value, content analyzer 306 determines whether the content file should be stored in option database 310 or mandatory database 312. In other embodiments, content analyzer 306 may include a decision tree structure in which a content file traverses through each node, and, based on the final node, content analyzer 306 may store the content file in option database 310 or mandatory database 312. In some embodiments, content analyzer 306 may generate a questionnaire corresponding to the content file in which the user may respond, and, based on the responses, content analyzer 306 may determine whether the content file should be stored in option database 310 or mandatory database 312.

Risk assessment module 308 retrieves relevant content files from option database 310 and mandatory database 312 to determine a level of risk associated with various aspects of the entity. In one embodiment, the level of risk may include the entity as a whole based on the content files retrieved from option database 310 and mandatory database 312. In another embodiment, the level of risk may include products and services offered by the entity in which only the relevant content files are retrieved from option database 310 and mandatory database 312 for an accurate assessment. In yet another embodiment, the level of risk may include types of activities conducted by the entity in which only the relevant content files are retrieved from option database 310 and mandatory database 312 for an accurate assessment. For example, a first risk assessment may be determined based on the entity's credit and loan services and a second risk assessment may be determined based on the entity providing such services in a first geographic region. In several embodiments, risk assessment module 308 retrieves a subset of the content files option database 310 and mandatory database 312 to ensure that risk assessments are computed with sufficient accuracy.

Option database 310 includes content files that include information referring to a series of obligation protocols that could be conducted by an entity although not required. As previously set forth above, an entity may comply with the series of optional obligation protocols to anticipate any future changes in regulations and/or obtain any benefits that could be gained through such conduct. In some embodiments, option database 310 may include a table in which information in content files can be extracted and stored in a structured format. In other embodiments, option database 310 may include a set of documents which include information referring to a series of optional obligation protocols that can be conducted by an entity. Mandatory database 312 includes content files that include information referring to at least one obligation protocol that require the entity to comply or refrain from conducting such protocols. In some embodiments, the entity's failure to implement or follow relevant information stored in mandatory database 312 may lead to negative consequences, ranging from sanctions to being barred from operating in a business space altogether. In some embodiments, mandatory database 312 may include a table in which information in content files can be extracted and stored in a structured format. In other embodiments, mandatory database 312 may include a set of documents which include information referring to a series of mandatory obligation protocols that can be conducted by an entity.

Client 314 includes graphical user interface 316 which allows the user to configure different settings of application 304. In one embodiment, graphical user interface 316 provides instructions to application 304 that a set of content files stored in option database 310 is not needed to be processed by risk assessment module 308. In one embodiment, graphical user interface 316 may designate at least one content file to be tracked by application 304 which can issue a tracking log on whether the entity followed the obligation protocols as set forth in the tracked content files. In one embodiment, graphical user interface 316 may interact with application 304 to determine whether a content file should be stored in option database 310 or mandatory database 312.

Figure 4:
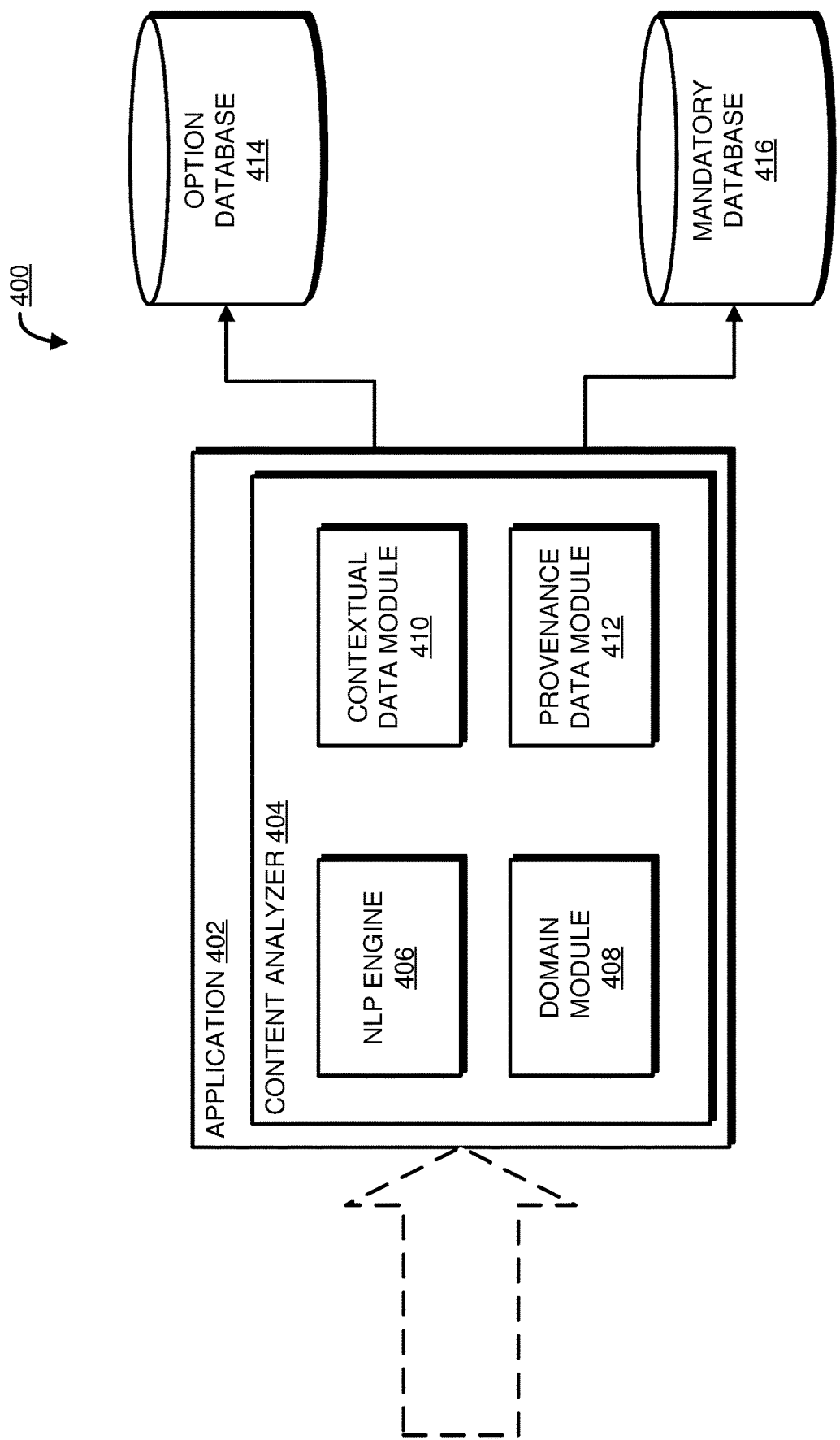
FIG. 4 depicts a block diagram of an example system for processing initial compliance file input in accordance with an illustrative embodiment.

With reference to FIG. 4, this figure depicts a block diagram of an example system for processing initial compliance file input in accordance with an illustrative embodiment. Application 402 is an example of application 105 in FIG. 1 and application 304 in FIG. 3. Content analyzer 404 is an example of content analyzer 306 in FIG. 3. Option database 414 is an example of option database 310 in FIG. 3. Mandatory database 416 is an example of mandatory database 312 in FIG. 3.

Application 402 includes content analyzer 404, which in turn includes NLP engine 406, domain module 408, contextual data module 410, and provenance data module 412. NLP engine 406 parses the content file to determine whether the content file should belong to option database 414 or mandatory database 416. In one embodiment, NLP engine 406 may perform natural language processing and parse the text corpus of the content file, including compliance obligation, and may output various analysis formats, including part-of-speech tagged text, phrase structure trees, and grammatical relations (typed dependency) format. In some embodiments, natural language processing algorithm can be trained through machine learning via a collection of syntactically annotated data such as the Penn Treebank. In one embodiment, NLP engine 406 may utilize lexicalized parsing to tokenize data records then construct a syntax tree structure of text tokens for each of data record. In another embodiment, NLP engine 406 may utilize dependency parsing to identifying grammatical relationships between each of the text tokens in each of the data records. For example, NLP engine 406 parses the text corpus of the content file and may identify the words "may," "shall," or "must." Based on the identified words, NLP engine 406 may assign a score based on a count of words "may" appearing in the text corpus, then if the score exceeds a first threshold value, may store the content file in option database 414. In another example, NLP engine 406 may assign a score based on a count of words "shall" and "must" appearing in the text corpus, then if the score exceeds a first threshold value, may store the content file in mandatory database 416.

Domain module 408 determines in which domain the content file is associated. In one embodiment, in response to the content file's domain matching the domain in which the entity is associated, e.g., domain in which the entity conducts its activities, domain module 408 may store the content file in mandatory database 416. In this embodiment, domain module 408 may store the content file in option database 414, in response to the content file's domain not matching the domain in which the entity is associated. In some embodiments, domain module 408 may configure a set of exceptions in which, if invoked, causes a content file to be always stored in mandatory database 416 regardless of whether the content file's domain not matching the entity's domain. For example, domain module 408 first identifies that the content file is associated with the "privacy" domain which in response invoke the exceptions to override the existing process and stores the content file in mandatory database 416.

Contextual data module 410 receives metadata and other secondary data associated with the content file and determines whether the content file should be stored in option database 414 or mandatory database 416. In one embodiment, context data module 410 generates a questionnaire and receives user response to allow content analyzer 404 to determine whether the content file is associated with optional or mandatory obligation protocols. In some embodiments, context data module 410 may retrieve content files previously stored in option database 414 and mandatory database 416 and generate a set of rules based on the data embedded in the previously stored content files. Thereafter, context data module 410 may evaluate a new incoming content file based on the set of rules and stores the content file in either option database 414 or mandatory database 416 based on the results of the evaluation. Provenance data module 412 may determine whether a content file should be stored in option database 414 or mandatory database 416 based on the origin of the content file, e.g., data sources 302A, 302B, or 302C. For example, if a content file was generated by data source 302A which is a standards organization, provenance data module 412 may store the content file in option database 414.

Figure 5:
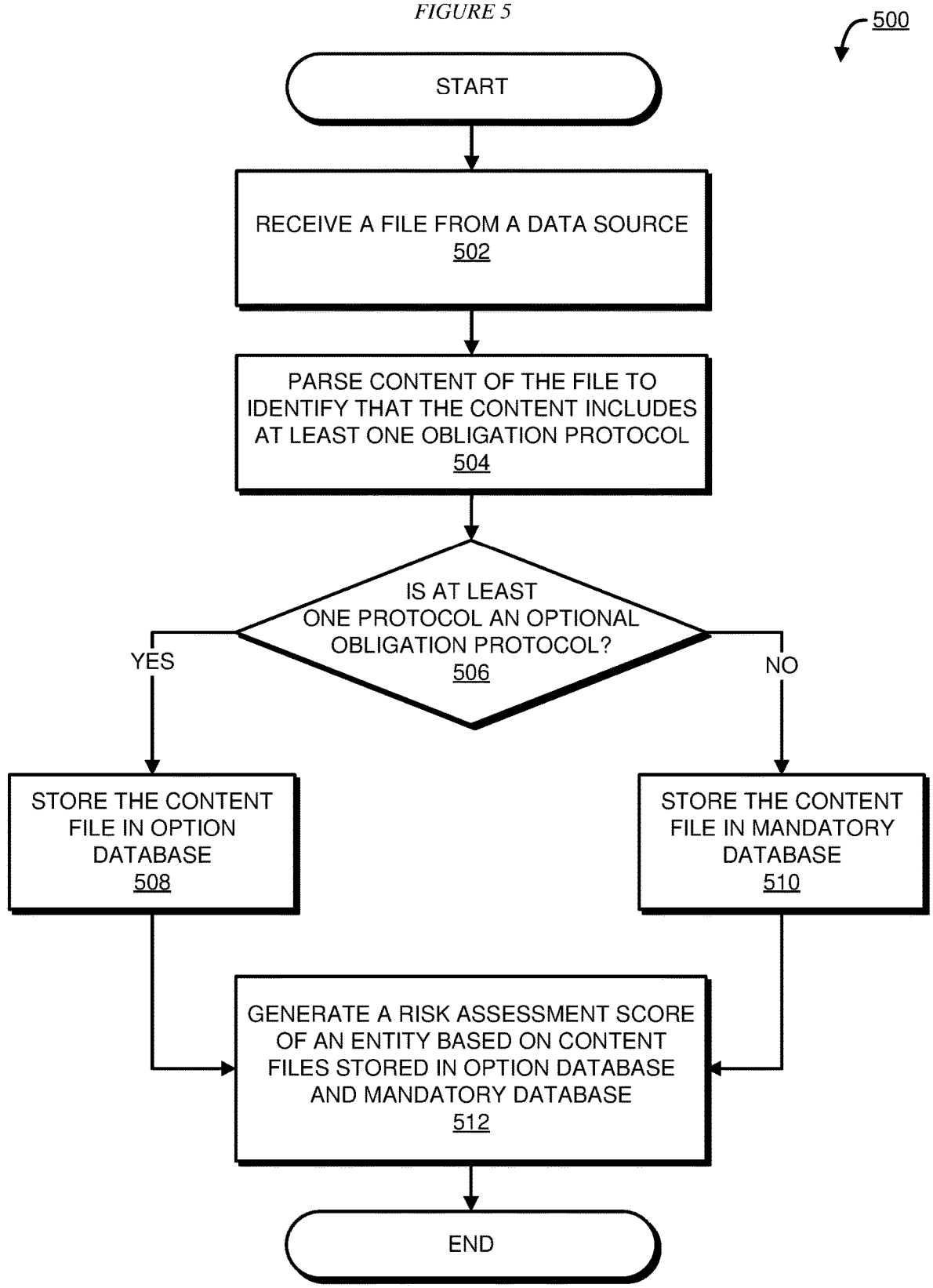
FIG. 5 depicts a flowchart of an example process for managing compliance data systems in accordance with an illustrative embodiment.

With reference to FIG. 5, this figure depicts a flowchart of an example process for managing compliance data systems in accordance with an illustrative embodiment. Process 500 may be implemented in application 302 in FIG. 3.

The application receives a file from a data source, the file comprising compliance data (block 502). In one embodiment, the data source may include regulatory agencies such as Consumer Financial Protection Bureau and Office of Foreign Asset Control. The application parses content of the file to identify that content of the file includes at least one obligation protocol (block 504). The application then determines whether the obligation protocol is an optional obligation protocol (block 506).

If the obligation protocol is determined to be an optional obligation protocol ("Yes" path of block 506), the application stores the content file in option database, such as option database 310 in FIG. 3 (block 508). If the obligation protocol is determined that it is not an optional obligation protocol ("No" path of block 506), the application stores the content file in mandatory database, such as mandatory database 312 in FIG. 3 (block 510). The application generates a risk assessment score of an entity based on the content files stored in option database and mandatory database (block 512). In some embodiments, the application may allow a user to select or deselect a subset of optional obligation protocols before the risk assessment score is generated. Process 500 terminates thereafter.

Thus, a computer implemented method, system or apparatus, and computer program product are provided in the illustrative embodiments for merging two documents that may contain different perspectives and/or bias. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of managing compliance data systems comprising:
   receiving, by one or more processors, a file from a data source, the file comprising compliance data;
   identifying, by one or more processors, at least one obligation protocol from content of the file;
   storing, by one or more processors, the content file in a first database in response to determining that the at least one obligation protocol is indicative of an optional obligation protocol; and
   generating, by one or more processors, a risk assessment score of the entity based on a subset of the optional obligation protocols, wherein
   the optional obligation protocol is an obligation protocol that can be conducted by an entity but not required.

2. The method according to claim 1,
   further comprising:
   storing, by one or more processors, the content file in a second database in response to determining that the at least one obligation protocol is indicative of mandatory obligation protocol that must be conducted by the entity; and
   adjusting, by one or more processors, the risk assessment score of the entity based on the mandatory obligation protocol.

3. The method according to claim 2, wherein
   the step of determining that the at least one obligation protocol is indicative of the optional obligation protocol is based on the data source.

4. The method according to claim 3, wherein
   the step of determining that the at least one obligation protocol is indicative of the optional obligation protocol further comprises:
   generating, by one or more processors, a set of protocol rules based on existing content files stored in the first database and the second database; and
   determining, by one or more processors, whether the content file should be stored in the first database or the second database based on the set of protocol rules.

5. The method according to claim 4, wherein
   the step of determining that the at least one obligation protocol is indicative of the optional obligation protocol further comprises:
   extracting, by one or more processors, keywords from the content file through performing a natural language processing algorithm;
   computing, by one or more processors, a first confidence score representative of a probability that the content file includes the optional obligation protocol; and
   storing, by one or more processors, the content files in the first database in response to the first confidence score exceeding a first threshold value.

6. The method according to claim 5, further comprising:
   computing, by one or more processors, a second confidence score representative of a probability that the content file includes the mandatory obligation protocol; and
   storing, by one or more processors, the content files in the second database in response to the second confidence score exceeding a second threshold value.

7. The method according to claim 6, wherein
   the content file is compliance obligation data generated by a regulatory entity data source.

8. A computer program product for managing compliance data systems, the computer program product comprising one or more computer readable storage medium and program instructions stored on at least one of the one or more computer readable storage medium, the program instructions comprising:
   program instructions to receive a file from a data source, the file comprising compliance data;
   program instructions to identify at least one obligation protocol from content of the file;
   program instructions to store the content file in a first database in response to determining that the at least one obligation protocol is indicative of an optional obligation protocol; and
   program instructions to generate a risk assessment score of the entity based on a subset of the optional obligation protocols, wherein
   the optional obligation protocol is an obligation protocol that can be conducted by an entity but not required.

9. The computer program product according to claim 8, further comprising:
   program instructions to store the content file in a second database in response to determining that the at least one obligation protocol is indicative of a mandatory obligation protocol that must be conducted by the entity; and
   program instructions to adjust the risk assessment score of the entity based on the mandatory obligation protocol.

10. The computer program product according to claim 9, wherein
    program instructions to determine that the at least one obligation protocol is indicative of the optional obligation protocol is based on the data source.

11. The computer program product according to claim 10, wherein
program instructions to determine that the at least one obligation protocol is indicative of the optional obligation protocol further comprises:
program instructions to generate a set of protocol rules based on existing content files stored in the first database and the second database; and
program instructions to determine whether the content file should be stored in the first database or the second database based on the set of protocol rules.

12. The computer program product according to claim 11, wherein
program instructions to determine that the at least one obligation protocol is indicative of the optional obligation protocol further comprises:
program instructions to extract keywords from the content file through performing a natural language processing algorithm;
program instructions to compute a first confidence score representative of a probability that the content file includes the optional obligation protocol; and
program instructions to store the content files in the first database in response to the first confidence score exceeding a first threshold value.

13. The computer program product according to claim 12, further comprising:
program instructions to compute a second confidence score representative of a probability that the content file includes the mandatory obligation protocol; and
program instructions to store the content files in the second database in response to the second confidence score exceeding a second threshold value.

14. The computer program product according to claim 13, wherein
the content file is compliance obligation data generated by a regulatory entity data source.

15. A computer system for managing compliance data systems, the computer system comprising one or more processors, one or more computer readable memories, one or more computer readable storage medium, and program instructions stored on at least one of the one or more storage medium for execution by at least one of the one or more processors via at least one of the one or more memories, the program instructions comprising:
program instructions to receive a file from a data source, the file comprising compliance data;
program instructions to identify at least one obligation protocol from content of the file;
program instructions to store the content file in a first database in response to determining that the at least one obligation protocol is indicative of an optional obligation protocol; and
program instructions to generate a risk assessment score of the entity based on a subset of the optional obligation protocols, wherein
the optional obligation protocol is an obligation protocol that can be conducted by an entity but not required.

16. The computer system according to claim 15, further comprising:
program instructions to store the content file in a second database in response to determining that the at least one obligation protocol is indicative of a mandatory obligation protocol that must be conducted by the entity; and
program instructions to adjust the risk assessment score of the entity based on the mandatory obligation protocol.

17. The computer system according to claim 16, wherein
program instructions to determine that the at least one obligation protocol is indicative of the optional obligation protocol is based on the data source.

18. The computer system according to claim 17, wherein
program instructions to determine that the at least one obligation protocol is indicative of the optional obligation protocol further comprises:
program instructions to generate a set of protocol rules based on existing content files stored in the first database and the second database; and
program instructions to determine whether the content file should be stored in the first database or the second database based on the set of protocol rules.

19. The computer system according to claim 18, wherein
program instructions to determine that the at least one obligation protocol is indicative of the optional obligation protocol further comprises:
program instructions to extract keywords from the content file through performing a natural language processing algorithm;
program instructions to compute a first confidence score representative of a probability that the content file includes the optional obligation protocol; and
program instructions to store the content files in the first database in response to the first confidence score exceeding a first threshold value.

20. The computer system according to claim 19, further comprising:
program instructions to compute a second confidence score representative of a probability that the content file includes the mandatory obligation protocol; and
program instructions to store the content files in the second database in response to the second confidence score exceeding a second threshold value.

* * * * *